United States Patent
Heo et al.

(10) Patent No.: US 9,361,947 B1
(45) Date of Patent: Jun. 7, 2016

(54) HARD DISK DRIVE MOTOR CUP SUPPORT

(71) Applicant: Western Digital Technologies, Inc., Irvine, CA (US)

(72) Inventors: Baekho Heo, San Jose, CA (US); Cheng Jin, San Jose, CA (US); Sara Sahebjam-Atabaki, Santa Clara, CA (US); Jifang Tian, Fremont, CA (US); Zachary P. Hills, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/735,461

(22) Filed: Jun. 10, 2015

(51) Int. Cl.
*G11B 33/08* (2006.01)
*G11B 19/20* (2006.01)

(52) U.S. Cl.
CPC ............ *G11B 33/08* (2013.01); *G11B 19/2018* (2013.01)

(58) Field of Classification Search
USPC ........................................................ 360/97.2
See application file for complete search history.

(56) References Cited

U.S. PATENT DOCUMENTS

| | | | | |
|---|---|---|---|---|
| 5,349,486 A * | 9/1994 | Sugimoto et al. | ........... | 360/99.15 |
| 5,430,589 A * | 7/1995 | Moir et al. | ................ | 360/97.2 |
| 5,510,954 A * | 4/1996 | Wyler | ................ | G06F 1/18 |
| | | | | 360/99.25 |
| 5,825,585 A * | 10/1998 | Hatam-Tabrizi | .......... | 360/99.16 |
| 5,958,212 A * | 9/1999 | Yamamura et al. | .......... | 205/723 |
| 6,005,768 A * | 12/1999 | Jo | ............ | G11B 33/08 |
| | | | | 248/638 |
| 6,125,097 A * | 9/2000 | Wu | ............ | 720/692 |
| 6,243,262 B1 * | 6/2001 | Koo | ........... | G06F 1/184 |
| | | | | 165/185 |
| 6,275,352 B1 * | 8/2001 | Tadepalli et al. | .......... | 360/99.18 |
| 6,469,864 B2 * | 10/2002 | Kamezawa | ........ | G11B 25/043 |
| | | | | 360/97.21 |
| 6,487,039 B1 * | 11/2002 | Bernett | ................ | 360/99.16 |
| 6,498,722 B1 * | 12/2002 | Stolz et al. | ............ | 361/679.36 |
| 6,567,265 B1 * | 5/2003 | Yamamura et al. | ...... | 361/679.34 |
| 6,697,213 B2 | 2/2004 | Lofstrom et al. | | |
| 7,106,583 B2 * | 9/2006 | Koh et al. | ............... | 361/679.36 |
| 7,251,100 B1 | 7/2007 | Frees et al. | | |
| 7,471,509 B1 * | 12/2008 | Oliver | ............ | 361/679.33 |
| 7,701,705 B1 | 4/2010 | Szeremeta | | |
| 7,889,461 B2 | 2/2011 | Stasiewicz et al. | | |
| 8,064,194 B2 | 11/2011 | Szeremeta | | |
| 8,113,873 B1 | 2/2012 | Sarraf | | |
| 8,133,426 B1 | 3/2012 | Yurchenco et al. | | |
| 8,358,395 B1 | 1/2013 | Szeremeta | | |
| 8,417,979 B2 | 4/2013 | Maroney | | |
| 8,462,460 B1 | 6/2013 | Szeremeta et al. | | |
| 8,498,088 B1 | 7/2013 | Klein | | |
| 8,547,658 B1 | 10/2013 | Szeremeta | | |
| 8,553,356 B1 | 10/2013 | Heo et al. | | |
| 9,019,657 B1 | 4/2015 | Nguyen et al. | | |
| 2003/0174464 A1 * | 9/2003 | Funawatari et al. | .......... | 361/685 |
| 2004/0190193 A1 * | 9/2004 | Kuwajima | ................ | 360/97.01 |
| 2006/0158775 A1 * | 7/2006 | Sega et al. | .................. | 360/97.01 |
| 2013/0155545 A1 * | 6/2013 | Casey et al. | ............... | 360/97.12 |

* cited by examiner

Primary Examiner — Carlos E Garcia

(57) ABSTRACT

A hard disk drive assembly having a hard disk drive positioned within an enclosure. A shock support is interposed between the hard disk drive and at least one wall of the enclosure so that external shocks on the enclosure are transmitted through the shock support. The shock support can be either a rigid support made of metal or a resilient support made of elastomeric material.

25 Claims, 4 Drawing Sheets

HARD DISK DRIVE MOTOR CUP SUPPORT

BACKGROUND

Data storage devices such as hard disk drives (HDDs) are typically mounted within enclosures. These enclosures can be portable and can be subjected to external shocks from events like the enclosure being dropped and the like. The hard disk drive includes rotating disks and one or more actuator arms that have pick up heads positioned on an end which travel over the spinning disks to read and write data. Physical shocks to this assembly can result in the drive no longer functioning in a desired manner or can result in lost data or poor performance.

BRIEF DESCRIPTION OF THE DRAWINGS

Systems and methods that embody various features of the invention will now be described in reference to the following drawings, in which.

DETAILED DESCRIPTION OF THE PREFERRED EMBODIMENT

Figure 1A:
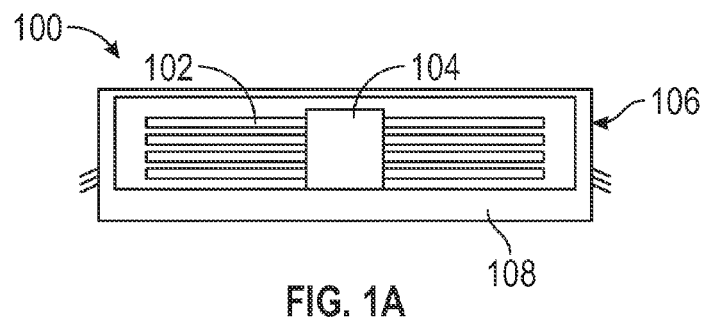
FIGS. 1A-1D are schematic cross-sectional drawings of existing hard disk drives that demonstrate the effect of shocks on the hard disk drive.
Figure 1B:
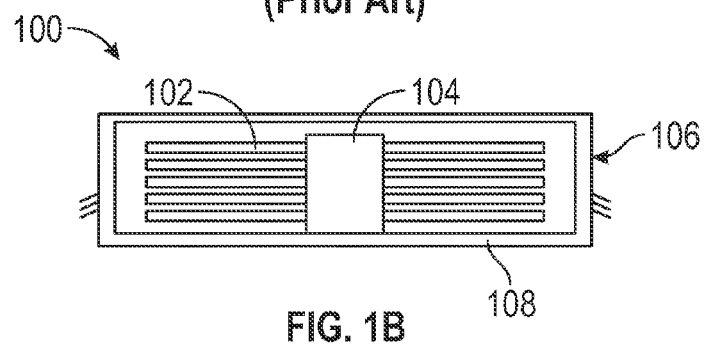

Reference will now be made to the drawings wherein like numerals refer to like parts throughout. As shown in FIGS. 1A and 1B, data storage devices such as hard disk drive assemblies 100 or solid state hybrid drives (SSHD) typically incorporate a plurality of disks 102 mounted on a spindle 104 that is connected to a motor causing the spindle and disks 102 to rotate. Typically, the disks 102, spindle 104 and motor are mounted within a hard disk drive housing 106 or are mounted on a surface such as a base plate. The data storage device may also include non-volatile semiconductor memory, such as NAND flash memory.

As the need for disk storage has increased, the number of disks 102 positioned on the spindle 104 has been increased. However, in many implementations, it is desirable to maintain the same form factor as existing hard disk drives so that the greater capacity hard disk drives can be used with existing devices and housings.

Figure 1C:
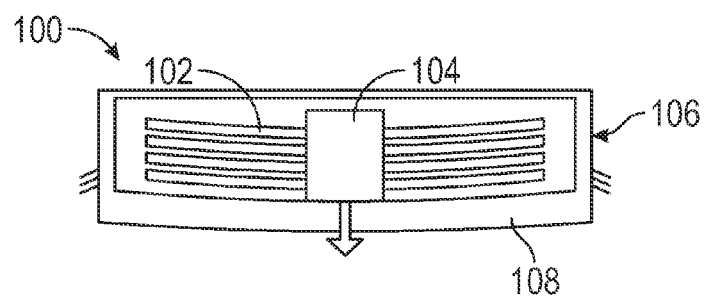
Figure 1D:
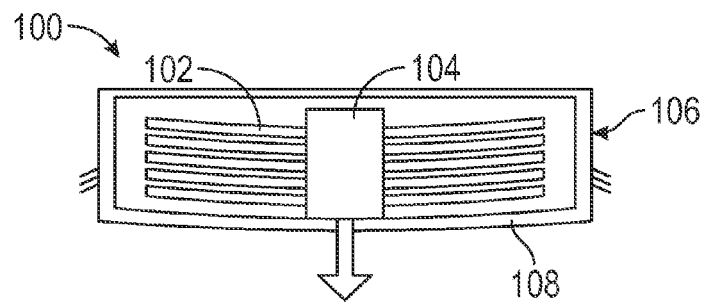

In some instances, the form factor can be maintained by making the thickness of one or more walls 108 thinner as is shown by comparison to FIGS. 1A to 1B. However, as shown in FIGS. 1C and 1D, decreasing the thickness of one or more of the walls 108 to accommodate more disks 102 can result in greater deformation of the wall 108 when the hard disk drive assembly 100 receives an external shock. Such shocks can occur when the hard disk drive is dropped or is hit by another object. This, in turn, can result in greater deformation or dislocation of the disks 102 which can result in the disks 102 or assembly 100 becoming damaged.

FIGS. 2A-2D illustrate an embodiment of a data storage device such as a hard disk drive assembly 100 in which one or more of the walls 108 such as a base plate 108a are reduced in thickness to accommodate additional disks 102. To address the issue of the greater deflection of the wall 108 as a result of its decreased thickness, the hard disk drive assembly 100 may include a mounting system 110 that extends between the hard disk drive housing 106 and an enclosure 112 that receives the hard disk drive housing 106. The mounting system 110 can comprise any of a number of mounting systems and, in this embodiment comprises a system that interconnects side walls 114 of the housing 106 with side walls 116 of the enclosure 112 to inhibit movement therebetween.

Figure 2A:
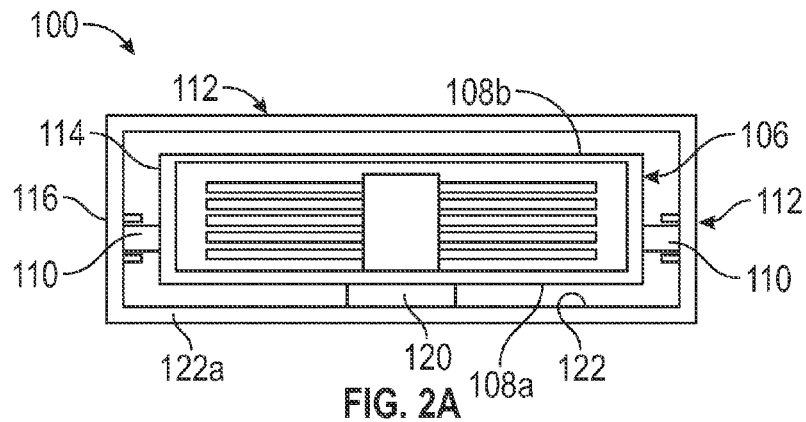
FIGS. 2A-2D are schematic cross-sectional drawings of hard disk drive assemblies of one embodiment of the present invention illustrating one exemplary manner in which the effects of shocks on the hard disk drive assemblies can be reduced.
Figure 2B:
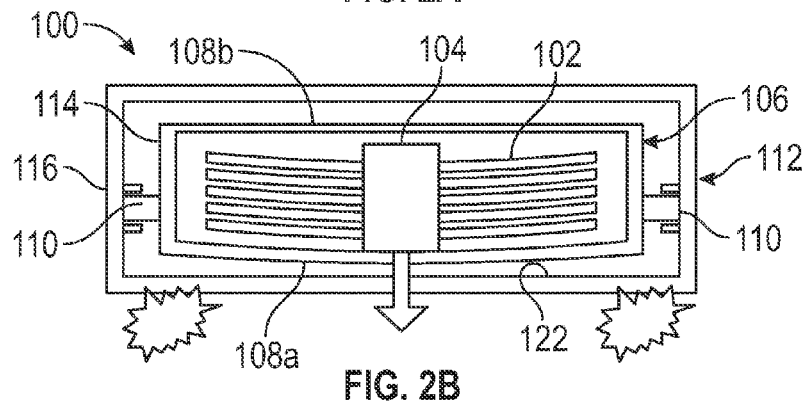

While this provides some additional protection to the hard disk drive assembly 100, some walls, such as a base plate 108a, may still be prone to move and deflect in the manner shown in FIG. 2B in response to external shocks. This deflection may be sufficient for the base plate 108a to deform sufficiently to either damage or impair operation of the hard disk drive assembly 100.

Figure 2C:
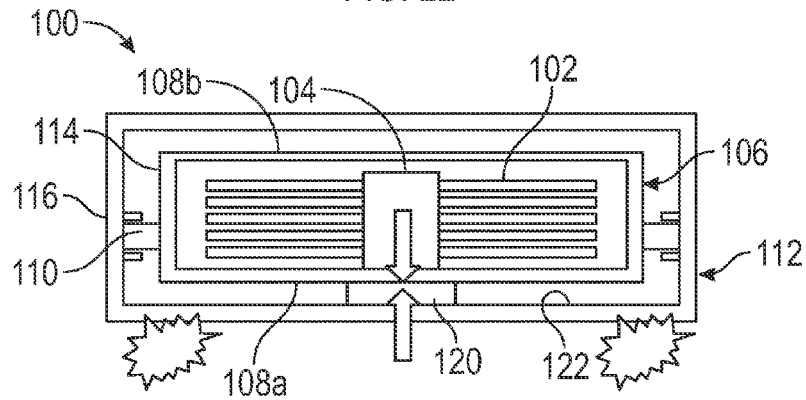

As shown in FIG. 2C, however, this embodiment of the hard disk drive assembly 100 contemplates positioning a shock support 120 between the base plate 108a and an inner wall 122 of the enclosure 112. In one implementation, the shock support 120 is positioned so as to intersect an axis of the spindle 104 and to be positioned adjacent a motor of the hard disk drive assembly 100. In one implementation, the shock support 120 is positioned so as to be in the approximate center of the base plate 108a which is the portion of the base plate 108a that is likely to deform the most as a result of external shocks.

In one implementation, the shock support 120 is formed of a rigid material such as aluminum and in another implementation the shock support 120 is formed of a compressible material such as an elastomeric material such as EPDM rubber. In one implementation, the shock support 120 is formed so as to be in physical contact with both the base plate 108a and the inner wall 122 of the enclosure 112 so that at least a portion of the forces that would be experienced by the hard disk drive housing 106 is transmitted directly through the shock support 120 in the manner shown in FIG. 2C.

In the implementation of the compressible shock support 120, the shock support 120 may be partially compressed when the assembly 100 is not receiving any shocks. In this way, a portion of the force due to shocks is transmitted by the shock support 120 from the hard disk drive housing 106 and the enclosure 112 and a portion of the force due to shocks may be absorbed by further compression of the compressible shock support 120.

Figure 2D:
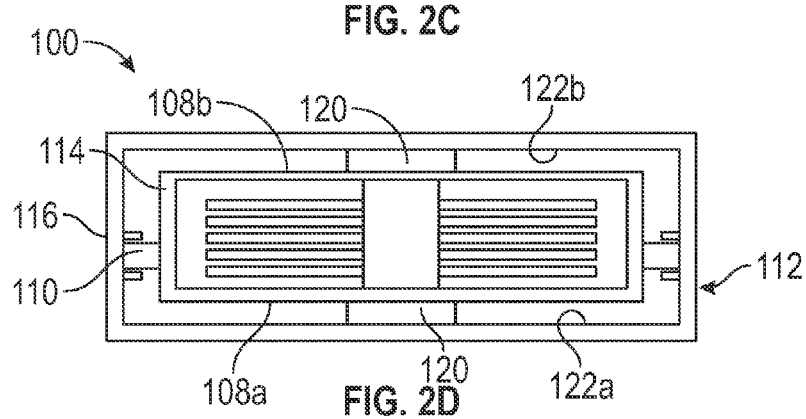

As shown in FIG. 2D, the shock support 120 can be positioned on multiple surfaces such as between a cover 108b of the hard disk drive housing 106 and an upper inner surface 122b of the enclosure 112. In this way, external shocks can be transmitted in two separate directions further inhibiting deflection or damage to the hard disk drive assembly 100.

Figure 3:
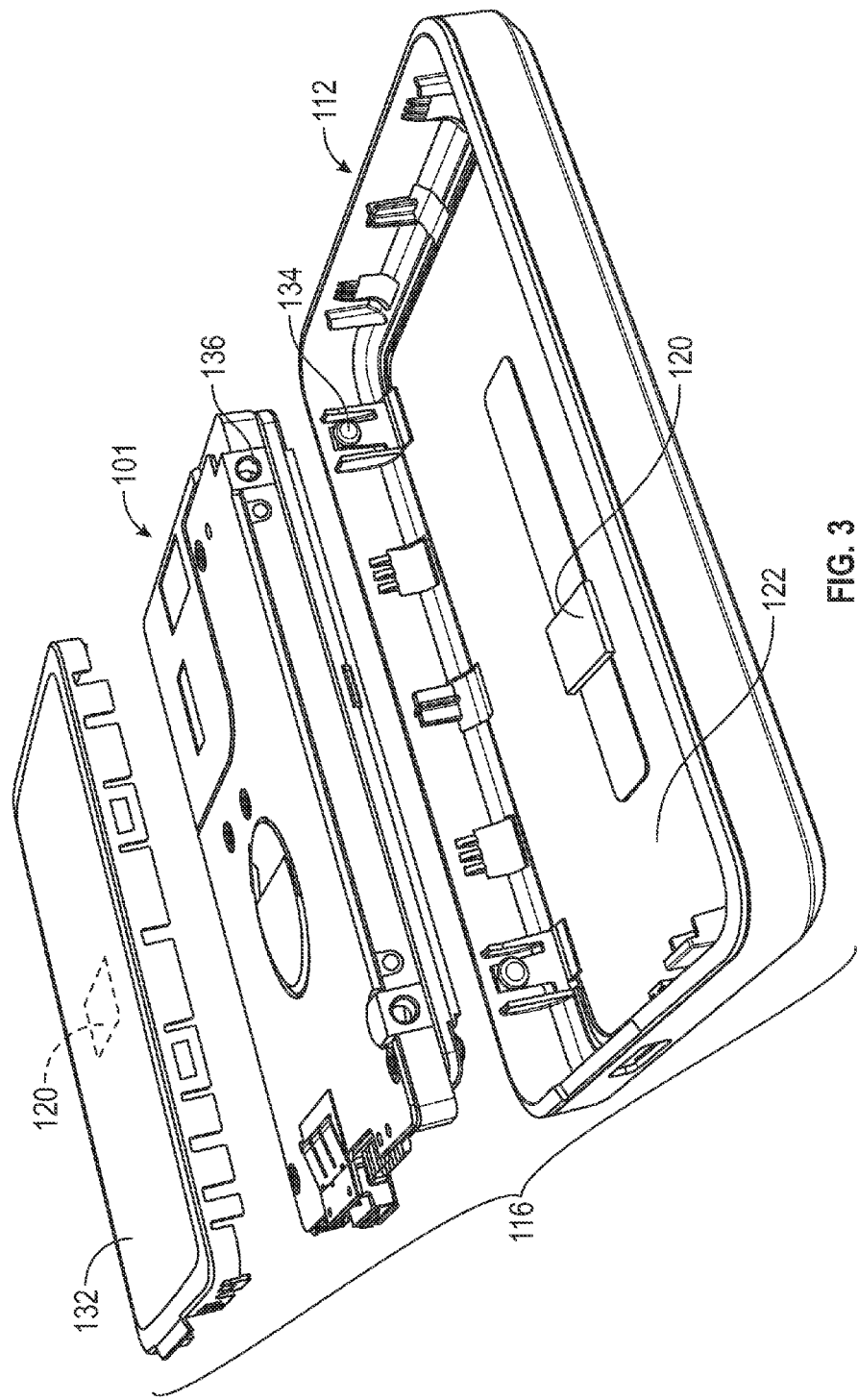
FIG. 3 is an exploded perspective view of a hard disk drive assembly incorporating at least one shock support.

FIG. 3 is an exploded perspective view of the hard disk drive assembly 100. As shown, there is a hard disk drive 101 that includes a base plate 108a. It is positioned within the hard disk drive enclosure 112 that, in this embodiment, is comprised of a first portion 130 and a second portion 132 that interconnect with each other. The first portion 130 defines a first surface 122a that receives the shock support 120 in the manner described above. Further, as shown in FIG. 3, a support 120 (shown in dashed lines) may also be positioned on the second portion 132. The first and second portions can comprise a base or bottom portion and a cover of the hard disk drive enclosure 112 and supports can be positioned on either one or both of the portions. The side mounting structure 110 in this embodiment includes projecting members 134 that extend outward from side walls 116 of the enclosure 112 and engage with openings 136 in the hard disk drive 101 to inhibit relative movement of the side walls 114 and 116. In this implementation, there are four side mounting structures 110 located at the approximate corners of the hard disk drive device 101 but this number can vary without departing from the scope of the present teachings.

Figure 4:
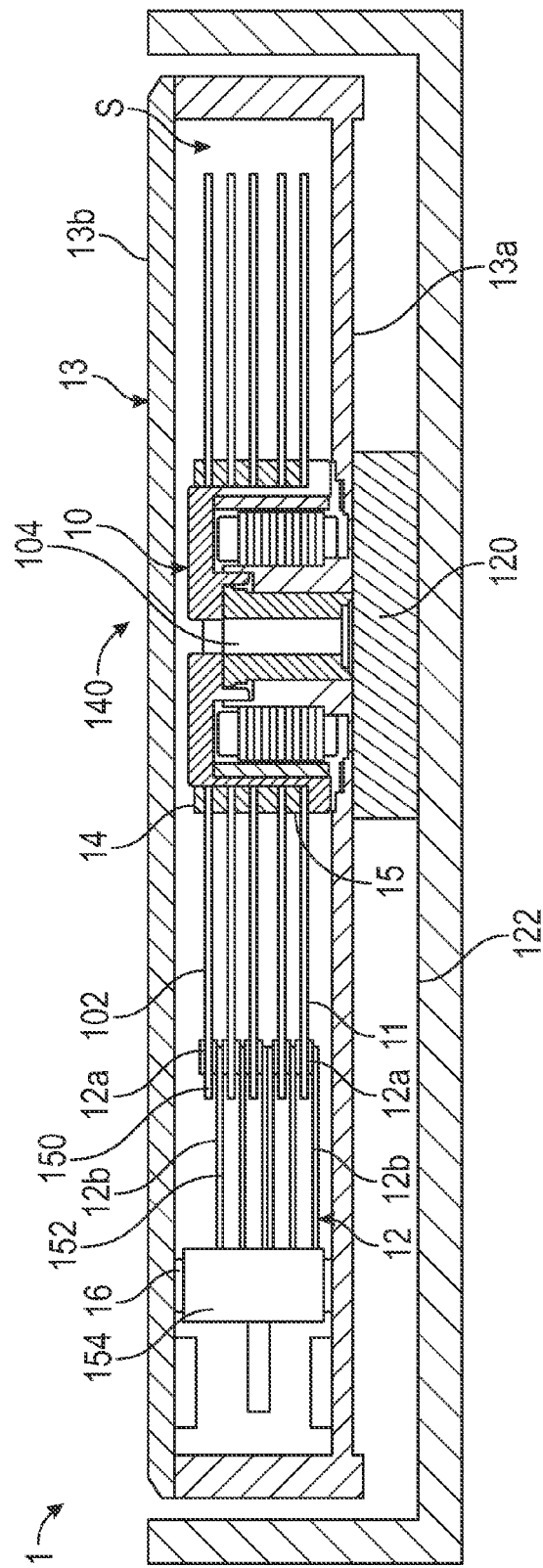
FIG. 4 is a cross-sectional of the hard disk drive assembly of FIG. 3.

As shown in FIG. 4, the support 120 is positioned underneath a motor assembly 140 of the hard disk drive 101 so as to be interposed between the inner surface 122a of the hard disk drive enclosure 112 and the base plate 108a of the hard disk drive 101. The hard disk drive 101 also includes typical components such as read write heads 150 mounted on head arms 152 that are moved in a known manner by a head actuator assembly 154.

In this implementation, the shock support 120 is sized so as to be the approximate size of the motor 160 the drives the spindle 104. A significant portion of the mass of the disk drive is located at the motor 160 which is also located near the center of the base plate 108a where the base plate 108a is most likely to deflect. By positioning the shock support 120 in this location, the deflection and deformation of the base plate 108a is reduced.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

Although the foregoing discussion has shown, illustrated and described embodiments of the present invention and uses thereof, it will be appreciated by those skilled in the art that various changes, substitutions and modifications to the disclosed embodiments and uses thereof without departing from the spirit or scope of the present invention. Hence, the scope of the present invention should not be limited to the foregoing discussion but should be defined by the appended claims.

What is claimed is:

1. A method of reducing deflection of a base plate of a hard disk drive device housing,
the method comprising:
mounting a data storage device with a motor and spindle with one or more storage media components mounted on the spindle positioned within a first housing into a second housing; and
interposing a shock support between the base plate of the first housing and the second housing so that shocks are at least partially transmitted between the first housing and the second housing via the shock support wherein the shock support is sized and interposed so that the cross-sectional area of the shock support overlaps the cross-sectional area of a motor that drives the spindle and so that the shock support contacts the base plate substantially over its entire cross-sectional area wherein the shock support is formed of a resilient material that is partially pre-compressed between the first and second housing when the data storage device is not experiencing shocks.

2. The method of claim 1, wherein the shock support is formed of a non-resilient material that contacts the first and the second housing when the data storage device is not experiencing shocks.

3. The method of claim 1, wherein the motor and spindle define an axis and the shock support is mounted proximate to the motor such that the plane of the shock support intersects the axis.

4. A data storage assembly comprising:
a data storage device comprising:
one or more storage media components arranged into a stack;
a spindle wherein the one or more storage media components are mounted to the spindle;
a motor attached to the spindle which rotates the spindle; and
a data storage device housing having a first wall with an inner surface and an outer surface, the outer surface of the first wall of the data storage device housing comprising a cross-sectional area, wherein the motor, the spindle and the one or more storage media components are mounted within the data storage device housing and wherein the motor is mounted on the inner surface of the first wall of the data storage device housing;
an outer housing that receives the data storage device wherein the outer housing includes a first wall that has an inner surface and an outer surface positioned proximate the first wall of the data storage device housing, the inner surface of the first wall of the outer housing comprising a cross-sectional area; and
a shock support interposed between the outer surface of the first wall of the data storage device housing and the inner surface of the first wall of the outer housing adjacent the location of the motor mounted on the inner surface of the first wall of the data storage device housing wherein the spindle defines an axis and the shock support is positioned so as to intersect the axis and wherein the motor has a motor cup with a first cross-sectional area and wherein the shock support has a second cross-sectional area that is less than the cross-sectional areas of the outer surface of the first wall of the data storage device housing and the inner surface of the first wall of the outer housing and the shock support is positioned such that the first and second cross-sectional areas overlap and so that the shock support contacts the outer surface of the first wall of the data storage device housing substantially over all of the second cross-sectional area.

5. The assembly of claim 4, wherein the one or more storage media components comprise magnetic storage media components.

6. The assembly of claim 4, wherein the data storage device housing and the outer housing each have two opposed side walls and wherein the shock support is located with respect to the side walls of the data storage device housing to reduce deflection of the central portion of the first wall of the data storage device housing.

7. The assembly of claim 6, wherein the opposed side walls of the data storage device housing and the outer housing are coupled to each other.

8. The assembly of claim 4, wherein the shock support comprises a first and second shock support.

9. The assembly of claim 8, wherein the first shock support is interposed between a base plate of the data storage device housing and the outer housing and the second shock support is interposed between a cover of the data storage device housing and the outer housing.

10. The assembly of claim 4, wherein the shock support is sized to contact the outer surface of the first wall of the data storage device housing and the inner surface of the first wall of the outer housing when the assembly is not experiencing shocks.

11. The assembly of claim 10, wherein the shock support transmits forces from the data storage device housing to the outer housing when the assembly is experiencing shocks that have a component that is directed in a direction extending between the data storage device housing and the outer housing.

12. The assembly of claim 10, wherein the shock support is formed of a rigid material.

13. The assembly of claim 12, wherein the shock support is formed of a plate of aluminum.

14. The assembly of claim 10, wherein the shock support is a shock absorbing support that is formed of a resilient material that compresses when the assembly is experiencing shocks to absorb at least a portion of the shock being transmitted between the data storage device housing and the outer housing.

15. The assembly of claim 14, wherein the shock absorbing support is partially pre-compressed between the outer surface of the first wall of the data storage device housing and the inner surface of the first wall of the outer housing when the assembly is not experiencing shocks.

16. The assembly of claim 15, wherein the shock absorbing support is formed of an elastomeric material.

17. A data storage assembly comprising:
a data storage device comprising:
one or more storage media components;
a spindle that receives the storage media components, wherein the spindle defines an axis;
a motor attached to the spindle which rotates the spindle and the storage media components; and
a data storage device housing that has a base plate having an inner and outer surface comprising a cross-sectional area, wherein the motor is mounted on the inner surface of the base plate;
an outer housing that receives the data storage device housing wherein the outer housing includes a first wall that has an inner surface and an outer surface positioned proximate the first wall of the data storage housing, the inner surface of the first wall of the outer housing comprising a cross-sectional area; and
a shock support interposed between an outer surface of the data storage device housing and the inner surface of the first wall of the outer housing wherein the shock support is positioned so as to intersect the axis and wherein the motor has a motor cup with a first cross-sectional area and wherein the shock support has a second cross-sectional area that is less than the cross-sectional areas of the outer surface of the base plate of the data storage device housing and the inner surface of the first wall of the outer housing and the shock support is positioned such that the first and second cross-sectional areas overlap and so that the shock support contacts the outer surface of the base plate of the data storage device housing substantially over all of the second cross-sectional area.

18. The assembly of claim 17, wherein the outer surface of the data storage device housing comprises a cover.

19. The assembly of claim 17, wherein the shock support is sized to contact the outer surface of the base plate of the data storage device housing and the inner surface of the first wall of the outer housing when the assembly is not experiencing shocks.

20. The assembly of claim 17, wherein the shock support is formed of a rigid material.

21. The assembly of claim 17, wherein the shock support is a shock absorbing support formed of a resilient material that compresses when the assembly is experiencing shocks.

22. The assembly of claim 17, wherein the data storage device housing and the outer housing each have two opposed side walls and wherein the shock support is located with respect to the side walls of the data storage device housing to reduce deflection of the central portion of the base plate of the data storage device housing.

23. The assembly of claim 17, wherein the outer surface of the data storage device housing comprises the base plate.

24. The assembly of claim 23, wherein the shock support transmits forces between the data storage device housing and the outer housing when the assembly is experiencing shocks.

25. The assembly of claim 24, wherein the shock absorbing support is partially pre-compressed between the outer surface of the base plate of the data storage device housing and the inner surface of the first wall of the outer housing when the assembly is not experiencing shocks.

* * * * *